(12) United States Patent
Needham

(10) Patent No.: US 11,321,828 B2
(45) Date of Patent: May 3, 2022

(54) MACHINE LEARNING SYSTEM ANIMAL AGE DETERMINATION

(71) Applicant: Canyon Equine Services, Canyon, TX (US)

(72) Inventor: Wayne Needham, Canyon, TX (US)

(73) Assignee: Wayne Needham, Canyon, TX (US)

( * ) Notice: Subject to any disclaimer, the term of this patent is extended or adjusted under 35 U.S.C. 154(b) by 0 days.

(21) Appl. No.: 16/379,467

(22) Filed: Apr. 9, 2019

(65) Prior Publication Data
US 2020/0327658 A1 Oct. 15, 2020

(51) Int. Cl.
*G06K 9/00* (2006.01)
*G06T 7/00* (2017.01)
*G06N 20/00* (2019.01)
*A01K 29/00* (2006.01)

(52) U.S. Cl.
CPC ............ *G06T 7/0012* (2013.01); *A01K 29/00* (2013.01); *G06N 20/00* (2019.01); *G06T 2207/30036* (2013.01)

(58) Field of Classification Search
CPC .. A01K 29/00; A01K 11/008; A01K 2207/12; A01K 2227/105; A01K 2267/0337; G06Q 10/08; G06Q 10/0833; G06Q 10/087; G06Q 10/10; G06Q 50/02; G16H 30/40; G16H 20/40; G16H 50/20; G01R 33/3873; G01R 33/56536; G01R 33/285
See application file for complete search history.

(56) References Cited

U.S. PATENT DOCUMENTS

| | | | |
|---|---|---|---|
| 8,483,446 B2 | 7/2013 | Demarais et al. | |
| 8,505,488 B2 | 8/2013 | Pratt | |
| 2005/0224001 A1* | 10/2005 | Golden | A01K 29/00 119/51.02 |
| 2010/0056898 A1 | 3/2010 | McKenna et al. | |
| 2012/0106812 A1* | 5/2012 | Stone-Collonge | A61B 5/445 382/128 |
| 2016/0140706 A1 | 5/2016 | Demarais et al. | |

FOREIGN PATENT DOCUMENTS

| | | |
|---|---|---|
| CN | 105913424 A | 8/2016 |
| TR | 201608512 A | 9/2016 |

OTHER PUBLICATIONS

Evans, Dr. Patricia A., et al.; "Aging Horses by Their Teeth"; AG/Equine/2007-06pr; Nov. 2007; 4 pages.
Equisearch; "How Old is That Horse?"; Jun. 30, 2005; Retrieved from: https://www.equisearch.com/discoverhorses/how-old-horse; 9 pages.
Jeffrey, Dale; "Oral Health in Equidae Fundamentals"; 2009; 3 pages.

* cited by examiner

*Primary Examiner* — Alex Kok S Liew
(74) *Attorney, Agent, or Firm* — Conley Rose, P.C.; J. Robert Brown, Jr.; Robert E. Kent

(57) ABSTRACT

Aspects of the present disclosure provide for a system. In some examples, the system includes a computing device configured to capture an image depicting dental characteristics of an animal and a server. The server is configured to receive the image from the computing device, determine a plurality of teeth depicted in the image, determine at least one feature associated with at least one of the plurality of teeth, determine an estimate age of the animal based at least partially on the determined plurality of teeth and the at least one feature, and provide the estimated age of the animal.

20 Claims, 5 Drawing Sheets

400

Lower Teeth

| Age (in years) | Features | | | Total Features |
|---|---|---|---|---|
| 1 | 'b1,b2,b3,b4,b5,b6' | 'bs1,bs2,bs3,bs4,bs5,bs6' | ' bss2,bss3,bss4,bss5 ' | 16 |
| 2 | 'b1,b2,b3,b4,b5,b6' | 'bs1,bs2,bs3,bs4,bs5,bs6' | ' bss2,bss3,bss4,bss5 ' | 16 |
| 3 | 'b1,b2,b3,b4,b5,b6' | 'bs1,bs2,bs3,bs4,bs5,bs6' | 'bss1,bss2   bss5,bss6' | 16 |
| 4 | 'b1,b2,b3,b4,b5,b6' | 'bs1,bs2,bs3,bs4,bs5,bs6' | 'bss1     bss6' | 14 |
| 5 | 'b1,b2,b3,b4,b5,b6' | 'bs1,bs2,bs3,bs4,bs5,bs6' | '   bss3,bss4   ' | 14 |
| 6 | 'b1,b2,b3,b4,b5,b6' | 'bs1,bs2,bs3,bs4,bs5,bs6' | 'bss1     bss6' | 14 |
| 7 | 'b1,b2,b3,b4,b5,b6' | 'bs1,bs2,bs3,bs4,bs5,bs6' | 'bbs1,bbs2,bbs3,bbs4,bbs5,bbs6' | 18 |
| 8 | 'b1,b2,b3,b4,b5,b6' | 'bs1,bs2,bs3,bs4,bs5,bs6' | 'bbs1,bbs2,bbs3,bbs4,bbs5,bbs6' | 18 |
| 9 | 'b1,b2,b3,b4,b5,b6' | 'bs1,bs2,bs3,bs4,bs5,bs6' | 'bbs1,bbs2,bbs3,bbs4,bbs5,bbs6' | 18 |
| 10 | 'b1,b2,b3,b4,b5,b6' | 'bs1,bs2,bs3,bs4,bs5,bs6' | 'bbs1,bbs2,bbs3,bbs4,bbs5,bbs6' | 18 |
| 11 | 'b1,b2,b3,b4,b5,b6' | 'bs1,bs2,bs3,bs4,bs5,bs6' | 'bbs1,bbs2,bbs3,bbs4,bbs5,bbs6' | 18 |
| 12 | 'b1,b2,b3,b4,b5,b6' | 'bs1,bs2,bs3,bs4,bs5,bs6' | 'bbs1,bbs2,bbs3,bbs4,bbs5,bbs6' | 18 |
| 13 | 'b1,b2,b3,b4,b5,b6' | 'bs1,bs2,bs3,bs4,bs5,bs6' | 'bbs1,bbs2,bbs3,bbs4,bbs5,bbs6' | 18 |
| 14 | 'b1,b2,b3,b4,b5,b6' | 'bs1,bs2,bs3,bs4,bs5,bs6' | 'bbs1,bbs2,bbs3,bbs4,bbs5,bbs6' | 18 |
| 15 | 'b1,b2,b3,b4,b5,b6' | 'bs1,bs2     bs5,bs6' | 'bbs1,bbs2,bbs3,bbs4,bbs5,bbs6' | 16 |
| 16 | 'b1,b2,b3,b4,b5,b6' | 'bs1       bs6' | 'bbs1,bbs2,bbs3,bbs4,bbs5,bbs6' | 14 |
| 17 | 'b1,b2,b3,b4,b5,b6' |  | 'bbs1,bbs2,bbs3,bbs4,bbs5,bbs6' | 12 |
| 18 | 'b1,b2,b3,b4,b5,b6' |  | 'bbs1,bbs2,bbs3,bbs4,bbs5,bbs6' | 12 |
| 19 | 'b1,b2,b3,b4,b5,b6' |  | 'bbs1,bbs2,bbs3,bbs4,bbs5,bbs6' | 12 |
| 20 | 'b1,b2,b3,b4,b5,b6' |  | 'bbs1,bbs2,bbs3,bbs4,bbs5,bbs6' | 12 |
| >20 | 'b1,b2,b3,b4,b5,b6' |  | 'bbs1,bbs2,bbs3,bbs4,bbs5,bbs6' | 12 |

Upper Teeth

| Age (in years) | Features | | | Total Features |
|---|---|---|---|---|
| 1 | 'u1,u2,u3,u4,u5,u6' | 'us1,us2,us3,us4,us5,us6' | ' uss2,uss3,uss4,uss5 ' | 16 |
| 2 | 'u1,u2,u3,u4,u5,u6' | 'us1,us2,us3,us4,us5,us6' | ' uss2,uss3,uss4,uss5 ' | 16 |
| 3 | 'u1,u2,u3,u4,u5,u6' | 'us1,us2,us3,us4,us5,us6' | 'uss1,uss2   uss5,uss6' | 16 |
| 4 | 'u1,u2,u3,u4,u5,u6' | 'us1,us2,us3,us4,us5,us6' | 'uss1     uss6' | 14 |
| 5 | 'u1,u2,u3,u4,u5,u6' | 'us1,us2,us3,us4,us5,us6' | '   uss3,uss4   ' | 14 |
| 6 | 'u1,u2,u3,u4,u5,u6' | 'us1,us2,us3,us4,us5,us6' | 'uss1     uss6' | 14 |
| 7 | 'u1,u2,u3,u4,u5,u6' | 'us1,us2,us3,us4,us5,us6' | 'uss1,uss2,uss3,uss4,uss5,uss6' | 18 |
| 8 | 'u1,u2,u3,u4,u5,u6' | 'us1,us2,us3,us4,us5,us6' | 'uss1,uss2,uss3,uss4,uss5,uss6' | 18 |
| 9 | 'u1,u2,u3,u4,u5,u6' | 'us1,us2,us3,us4,us5,us6' | 'uss1,uss2,uss3,uss4,uss5,uss6' | 18 |
| 10 | 'u1,u2,u3,u4,u5,u6' | 'us1,us2,us3,us4,us5,us6' | 'uss1,uss2,uss3,uss4,uss5,uss6' | 18 |
| 11 | 'u1,u2,u3,u4,u5,u6' | 'us1,us2,us3,us4,us5,us6' | 'uss1,uss2,uss3,uss4,uss5,uss6' | 18 |
| 12 | 'u1,u2,u3,u4,u5,u6' | 'us1,us2,us3,us4,us5,us6' | 'uss1,uss2,uss3,uss4,uss5,uss6' | 18 |
| 13 | 'u1,u2,u3,u4,u5,u6' | 'us1,us2,us3,us4,us5,us6' | 'uss1,uss2,uss3,uss4,uss5,uss6' | 18 |
| 14 | 'u1,u2,u3,u4,u5,u6' | 'us1,us2,us3,us4,us5,us6' | 'uss1,uss2,uss3,uss4,uss5,uss6' | 18 |
| 15 | 'u1,u2,u3,u4,u5,u6' | 'us1,us2,us3,us4,us5,us6' | 'uss1,uss2,uss3,uss4,uss5,uss6' | 18 |
| 16 | 'u1,u2,u3,u4,u5,u6' | 'us1,us2,us3,us4,us5,us6' | 'uss1,uss2,uss3,uss4,uss5,uss6' | 18 |
| 17 | 'u1,u2,u3,u4,u5,u6' | 'us1,us2,us3,us4,us5,us6' | 'uss1,uss2,uss3,uss4,uss5,uss6' | 18 |
| 18 | 'u1,u2,u3,u4,u5,u6' | 'us1,us2     us5,us6' | 'uss1,uss2,uss3,uss4,uss5,uss6' | 16 |
| 19 | 'u1,u2,u3,u4,u5,u6' | 'us1       us6' | 'uss1,uss2,uss3,uss4,uss5,uss6' | 14 |
| 20 | 'u1,u2,u3,u4,u5,u6' |  | 'uss1,uss2,uss3,uss4,uss5,uss6' | 12 |
| >20 | 'u1,u2,u3,u4,u5,u6' |  | 'uss1,uss2,uss3,uss4,uss5,uss6' | 12 |

*FIG. 4*

MACHINE LEARNING SYSTEM ANIMAL AGE DETERMINATION

SUMMARY

Aspects of the present disclosure provide for a system. In some examples, the system includes a computing device configured to capture an image depicting dental characteristics of an animal and a server. The server is configured to receive the image from the computing device, determine a plurality of teeth depicted in the image, determine at least one feature associated with at least one of the plurality of teeth, determine an estimate age of the animal based at least partially on the determined plurality of teeth and the at least one feature, and provide the estimated age of the animal.

Other aspects of the present disclosure provide for a method. In some examples, the method includes obtaining an image depicting dental characteristics of an animal, determining a plurality of teeth depicted in the image, determining at least one feature associated with at least one of the plurality of teeth, determining an estimate age of the animal based at least partially on the determined plurality of teeth and the at least one feature, and providing the estimated age of the animal to a user.

Other aspects of the present disclosure provide for an apparatus. In some examples, the apparatus includes a non-transitory memory configured to store executable program instructions and a processor. The processor is configured to execute the program instructions to obtain an image depicting dental characteristics of an animal, determine a plurality of teeth depicted in the image, determine at least one feature associated with at least one of the plurality of teeth, determine an estimate age of the animal based at least partially on the determined plurality of teeth and the at least one feature, and provide the estimated age of the animal to a user.

BRIEF DESCRIPTION OF THE DRAWINGS

For a detailed description of various examples, reference will now be made to the accompanying drawings in which:

FIG. 4 shows a table in accordance with various examples; and

DETAILED DESCRIPTION

Figure 1:
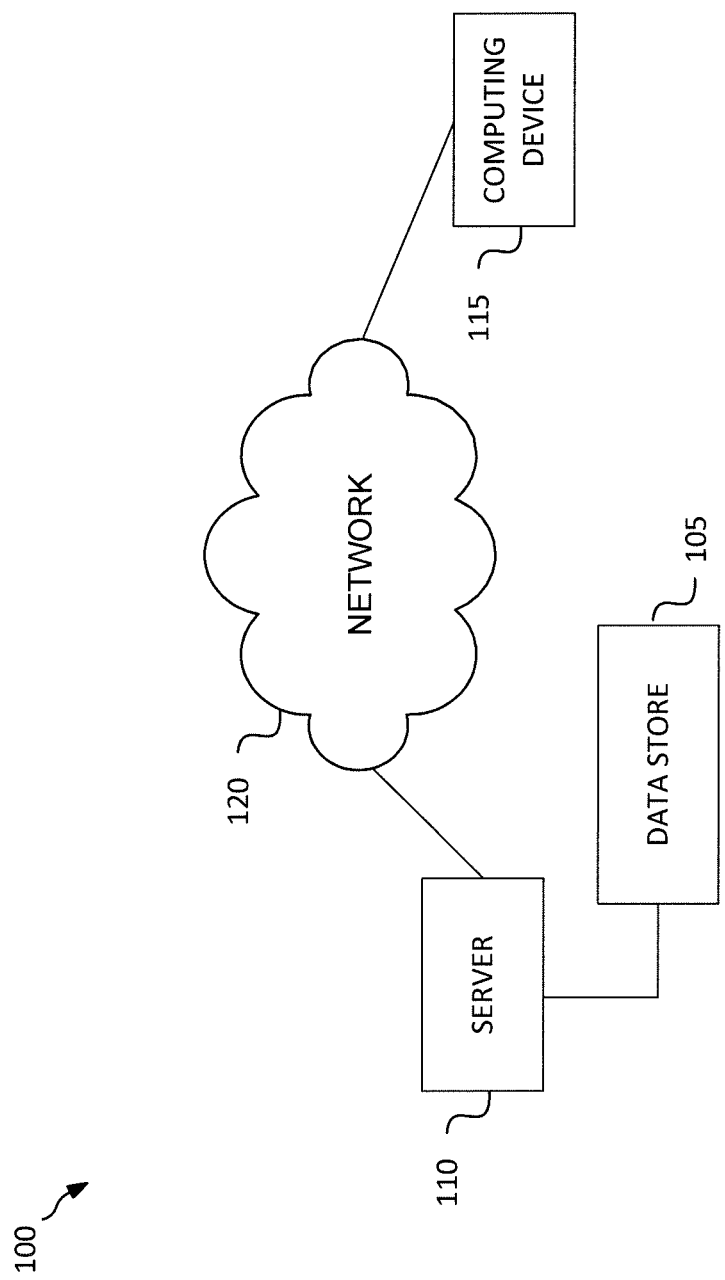
FIG. 1 shows a block diagram of an illustrative system in accordance with various examples.

Knowing an age of an animal with a degree of accuracy can sometimes be desirable. For example, when training an animal, determining whether an animal is suitable for certain activities, when evaluating the animal for medical care or rendering medical care to the animal, and/or when buying or selling the animal, it may be desirable to know an age of the animal with a degree of accuracy. In some examples, such as horse (e.g., equine) age determination, an age of the horse can be determined based on one or more dental characteristics of the horse. However, conventional techniques for determining an age of a horse based on dental characteristics can be inefficient, impractical, inaccurate, and/or difficult. For example, some techniques for determining an age of a horse involve determining a ratio of proportions of characteristics of the horse's teeth. This can be done very imprecisely, such as by visually observing the teeth of the horse and estimating the proportions, or precisely by using a measuring device to measure the horse's teeth. Both are impractical and have a potential for discomfort for the horse and/or injury for an individual attempting to determine the horse's age. For example, to precisely determine the horse's age by measuring the horse's teeth, the horse's mouth would have to be held open for an extended period of time, causing discomfort for the horse and causing a potential for harm to an individual performing the measurement if the horse decides to close his mouth more forcefully than the individual is able to prevent.

At least some aspects of the present disclosure provide for a system for determining an age of an animal based on dental characteristics. In some examples, one or more photographs of the animal are uploaded to the system by a user. The one or more photographs can include photographs of any number of the animal's teeth, which in at least some examples includes images of a greater number of the animal's teeth and/or the animal's teeth from a greater number of angles. The additional images, in some examples, result in a more precise age determination than examples in which fewer of the animal's teeth or the animal's teeth from fewer angles are included in the photographs. In some examples, the system receives the one or more photographs of the animal via electronic communications from another device, such as a device that captured the one or more photographs of the animal (e.g., such as a smartphone). In other examples, the system receives the one or more photographs of the animal from a device operating as an interface to the device that captured the one or more photographs of the animal (e.g., such as a computing device reading data from a data storage device to which the one or more photographs of the animal were stored, such as by a camera when capturing the one or more photographs of the animal). In yet other examples, the system that performs the age determination of the animal also captures the one or more photographs of the animal (e.g., such as a smartphone both capturing the one or more photographs and making the age determination).

In at least some examples, to determine the age of the animal based on the one or more photographs of the animal, the one or more photographs are processed to identify and isolate individual teeth of the animal. Each individual tooth is then further processed to identify and isolate individual features and/or characteristics of the tooth. In the example of a horse's tooth, the image of the tooth is further processed to identify proportions of the surface area of the tooth (e.g., width vs. depth of the visible surface (chewing surface) of the tooth, a shape of an Infundibulum (sometimes referred to as a cup) of the tooth, a shape of a Dental Star of the tooth (e.g., secondary dentin that has backfilled a pulp chamber of the tooth), and/or a length of a Galvayne's Groove of the tooth. In examples of other non-equine animals, the teeth are examined to identify and isolate any other suitable features or characteristics that can be indicative of an age of the animal.

In at least some examples, after the individual features and/or characteristics of each tooth are identified and isolated, the system places bounding boxes around the individual features and/or characteristics of each tooth. The bounding boxes, in at least some examples, have minimum length and width dimensions possible for fully enclosing the individual features and/or characteristics of each tooth. The features identified by the bounding box are subsequently compared to features from a database to determine an estimated age range for the animal. The database includes, in some examples, a plurality of training images of animals of similar species and known ages having the individual features and/or characteristics of each tooth depicted in the training images identified by bounding boxes, such that an image in the database is comparable to an image received by the system to estimate an age of the animal. For example, when individual features and/or characteristics of teeth identified in an image received by the system (e.g., an image received for animal age determination based at least partially on the image) are sufficiently similar to individual features and/or characteristics of teeth of a training image of the database, the animal depicted in the image received by the system can be estimated based on the known age of the animal depicted in the training image. In at least some examples, the individual features and/or characteristics of teeth identified in an image received by the system and the individual features and/or characteristics of teeth of a training image are not an exact match and an estimate of the animal's age is provided as an age range and/or provided with a confidence level. For example, an age range and a confidence level in the accuracy of that age range may be given, an age range may be given alone, a particular age and a confidence level in the accuracy of that particular age may be given, or a particular age may be given alone.

Turning now to FIG. 1, an illustrative system 100 for determining an age of an animal based on dental characteristics is shown. In at least some examples, the system 100 includes a data store 105, a server 110, and a computing device 115. The data store 105, server 110, and computing device 115 are communicatively coupled, in some examples, via a network 120, which may be any combination of the Internet, a cellular network, a local area network (LAN), a wide area network (WAN), a public network, and/or a private network, that operates using a plurality of devices (not shown) such as routers, switches, base stations, transmitters, receivers, antennas, or other devices configured to facilitate communication. Further, in at least some examples the data store 105 and the server 110 may be co-located such that the data store 105 is communicatively coupled to the server 110 through a coupling other than the network 120 or the data store 105 is a component of the server 110. Similarly, in at least some examples the data store 105 and the computing device 115 may be co-located such that the data store 105 is a component of the computing device 115.

The computing device 115 is, in some examples, a smartphone with image capturing capabilities. In other examples, the computing device 115 is a device that interfaces with an image storage and/or capturing device (e.g., such as a camera, a storage device such as a memory card from a camera, etc.). In at least some examples, the server 110 hosts a service, interface, website, or otherwise executes code configured to determine an age of an animal based on one or more photographs of the animal. In one example, an application executing on the computing device 115 analyzes the one or more photographs of the animal and executes one or more calls to the server 110 via the network 120 to determine the age of the animal. In another example, the computing device 115 transmits the one or more photographs of the animal to the server 110 and the server 110 executes an application that determines the age of the animal based on the one or more photographs of the animal and returns the determined age to the computing device 115. In yet another example, the computing device 115 interacts with a website hosted by the server 110 to upload the one or more photographs of the animal to the server 110 and the server 110 analyzes the one or more photographs of the animal and returns the determined age to the computing device 115 (e.g., by writing the determined age to a page of a website hosted by the server 110 and accessed and displayed by the computing device 115).

In at least some examples, the server 110 and/or the computing device 115 determine the age of the animal based on the one or more photographs of the animal at least partially according to data stored in the data store 105. For example, the data store 105 includes a machine learning database with one or more tagged images for use in determining the age of an animal. In other examples, the data store 105 includes a database of data resulting from tagged images (e.g., such as a database associating dimensions associated with the animal, an age of the animal, a gender of the animal, a genus, species, breed, type, etc. of the animal) and the tagged images themselves are not stored in the data store 105.

In at least some examples, the tagged images are tagged by a user in a training process for the machine learning database and/or the system 100. The tagged images include, in at least some examples, a plurality of pictures of a particular animal genus, animal species, animal breed, animal gender, and/or animal age group. Each of the tagged images is, in at least some examples, of a known animal such that an age and other characteristics of the animal are known and the tagged images operate as a control group for age determination. The tagged images are tagged by the user with any one or more of a gender of an animal depicted in the tagged images, an age of the animal depicted in the tagged images, a genus, species, and/or breed of the animal depicted in the tagged images. The tagged images are further tagged by the user with one or more bounding boxes surrounding elements of the tagged images. For example, each tooth visible in the tagged image is tagged by the user with a bounding box and each element of the tooth that may be considered for use in age determination of the animal is itself tagged by the user with a bounding box, such that each element visible in the tagged image that may be used in age determination of the animal is bounded by a bounding box and tagged to identify the type of feature. In at least some examples, the tagged images are cropped prior to being tagged by the user. For example, the tagged images are cropped by the user to a minimum size possible while still including all elements of the tagged images for tagging by the user. In other examples, the tagged images are cropped by the system automatically based on any suitable object recognition technology, such as an object recognition application programming interface (API) that accesses object recognition software for identifying the elements of the tagged image for tagging by the user. In at least some examples, each bounding box is defined according to its position with respect to a single, common point of the tagged image (e.g., such that each bounding box is defined by its coordinates in the tagged image). For example, each bounding box is defined by a starting point (e.g., such as a corner point) having a defined lateral and vertical distance from the common point of the tagged image, a height and width from that starting point, and an element of the animal (e.g., such as a tooth or feature of a tooth) encompassed by the bounding box. In this way, the machine learning database includes associations between characteristics of each tagged feature of the animal's tooth (e.g., length vs. width proportions, surface area, etc.) as defined by the bounding boxes and the tags such as gender of the animal, age of the animal, a genus, species, and/or breed of the animal, etc.

Based on the associations between elements of the tagged images tagged by the user, the system 100 (either through the server 110, the computing device 115, or both) learns, through a machine learning process, an association among characteristics of the animal that are depicted in the tagged images (e.g., such as elements of an animal's teeth) and the age of the animal. Based on the learned association, the system 100 predicts an age of an animal when the system 100 receives and/or captures an image of an animal's teeth. For example, when the system 100 receives an image of an animal having a genus, species, type, etc. that corresponds to an animal having tagged images in the machine learning database stored in the data store 105 the system 100 determines an estimated age of the animal based on the image of the animal's teeth and the machine learning database stored in the data store 105. For example, when the system 100 receives an image of a horse's teeth and tagged images of horses' teeth are stored in the machine learning database, the system 100 determines an estimated age of the horse depicted in the image based on the tagged images of horses' teeth. When the system 100 receives an image of a cow's teeth and tagged images of cows' teeth are stored in the machine learning database, the system 100 determines an estimated age of the cow depicted in the image based on the tagged images of cows' teeth. When the system 100 receives an image of a dog's teeth and tagged images of dogs' teeth are stored in the machine learning database, the system 100 determines an estimated age of the dog depicted in the image based on the tagged images of dogs' teeth. When the system 100 receives an image of an animal's teeth that does not correspond to data included in the machine learning database stored in the data store 105, in at least some examples the system 100 provides an output indicating an inability to determine an estimated age of the animal.

When an animal is presented for age determination, one or more photographs of the animal's teeth are captured. In some examples, the photographs are captured by the computing device 115 (such as when the computing device 115 is a smartphone with photography capabilities) while in other examples the photographs are provided to the computing device 115 directly or indirectly from another device that captured the photographs. The photographs are subsequently processed to identify one or more teeth in the photographs and one or more features of the teeth that are used for age determination. The photographs are processed, in some examples, by the application executed by the system 100 (e.g., executing on the computing device 115 and/or the server 110). For example, the application analyzes the photographs to identify all teeth included in the photographs and crops the photographs to a minimum size possible while still including all teeth depicted in the photographs. The application then analyzes the photographs to identify and surround each tooth of the images with a bounding box and identify and surround each feature of the teeth that is used for determining an age of the teeth with a bounding box. The teeth and the feature(s) of the teeth are identified, in some examples, through implementation of an object recognition API. For example, in at least some implementations of the application, the teeth and the feature(s) of the teeth are identified by a Tensorflow Object Detection API as provided by GOOGLE. In other examples, an object detection from any suitable vendor may be used in place of the Tensorflow Object Detection API provided by GOOGLE. In at least some examples, the application converts the photographs from a color format to a greyscale or black and white format prior to application of bounding boxes to the teeth and features of the teeth. In at least some examples, at least some of the bounding boxes have different colors. For example, bounding boxes around teeth may have a first color, bounding boxes around a first type of feature of the teeth may have a second color, bounding boxes around a second type of feature of the teeth may have a third color, etc. such that the various bounding boxes assigned to the photographs are distinguishable from one another.

In various examples, any suitable number of teeth are identified and analyzed per photograph. For example, in some implementations about 6 teeth are identified and analyzed per photograph. In other implementations more, or fewer, teeth are identified and analyzed. The teeth are analyzed, as discussed above, to identify features of the teeth. In at least some examples, the identified teeth are analyzed to identify any suitable number of elements per teeth. For example, the identified teeth are analyzed to identify about three features per tooth. For example, the identified teeth are analyzed to identify a shape of the teeth, a shape of an Infundibulum of the teeth, and/or a shape of a dental star of the teeth. In various examples, some teeth may include all of the features and some teeth may include fewer than all of the features, for example, based on an age of the animal whose teeth are depicted in the photograph. In at least some examples, a confidence level may be derived from the number of features identified for a given photograph. For example, a confidence level in the accuracy of an analysis of a photograph may be determined according to a ratio of a number of features identified in the photograph to a maximum number of features searched for in the photograph. For example, if X features are identified and Y features were searched for, the confidence level may be determined by X divided by Y. In the above example of identifying 6 teeth and three features per tooth, Y equals six times three, totaling 18. The teeth and the features are identified, in at least some examples by the object detection API, such as the Tensorflow Object Detection API or a suitable alternative capable of performing object detection.

Characteristics of the teeth and/or features of the teeth are then determined according to the bounding boxes. For example, based on dimensions of the bounding boxes, dimensions of the teeth and/or features of the teeth can be determined (e.g., width vs. depth of the teeth and/or features of the teeth, a surface area of the teeth and/or features of the teeth, etc.). In at least some examples, the dimensions are unrelated to any particular scaling or unit of measurement (e.g., such that no element is required to be visible in the photographs for determining a proper scale for processing of the photographs). For example, the dimensions are relative only to one another, such that any generic unit is suitable for defining the dimensions of the bounding boxes. The determined characteristics are then compared to data of the data store 105, such as the machine learning database, to estimate an age of the animal that was presented for age determination. As discussed above, in some examples at least a portion of the age determination process is performed by the server 110. In other examples, a portion of the age determination process is performed by the computing device 115. In yet other examples, portions of the age determination process are performed by the server 110 and the computing device 115.

Figure 2:
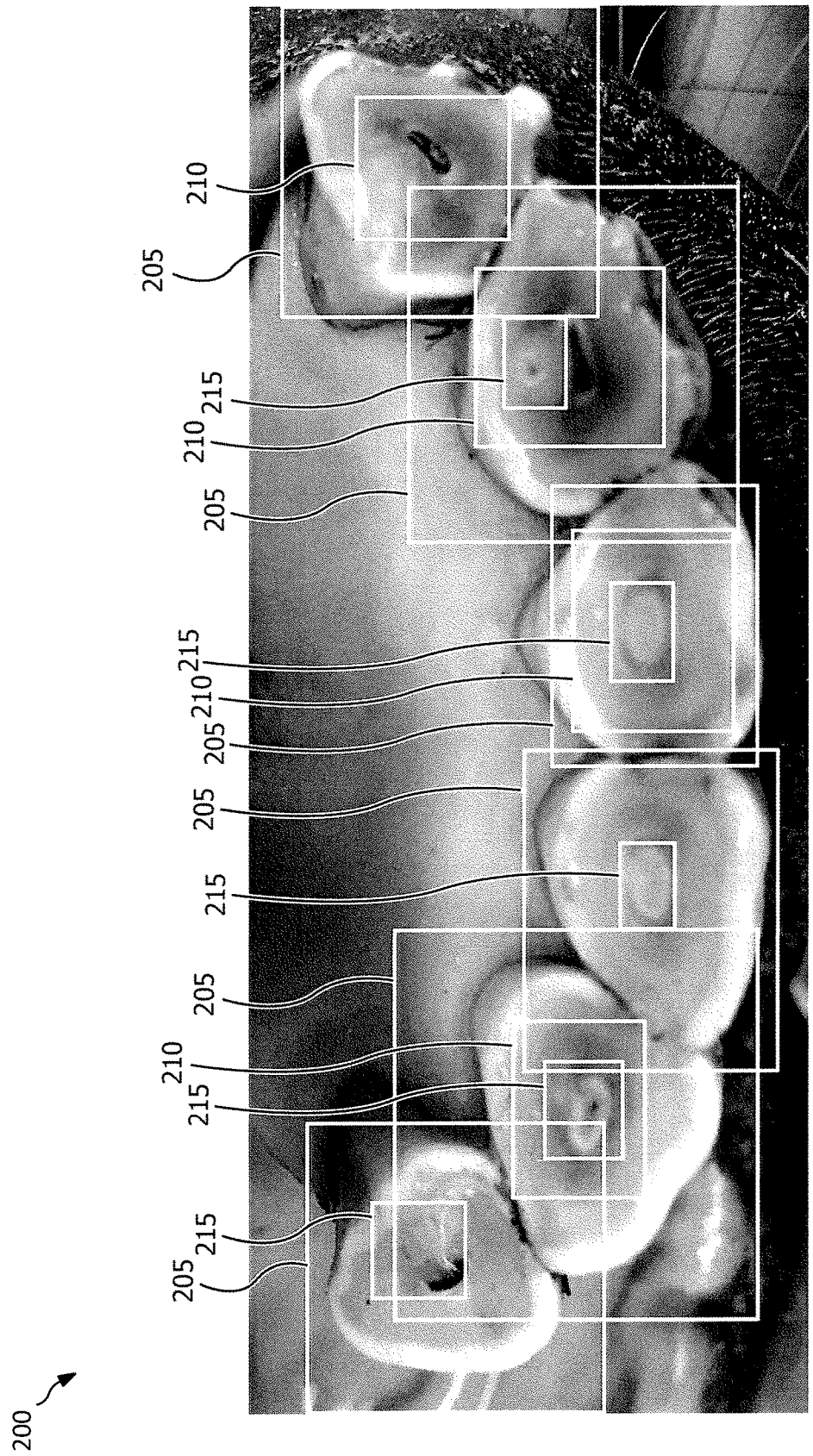
FIG. 2 shows an image of an illustrative tagged image in accordance with various examples.

Turning now to FIG. 2, an image of an illustrative tagged image 200 is shown. The tagged image 200, in at least some examples, is representative of an image processed by the system 100 of FIG. 1. For example, the tagged image 200 illustrates bounding boxes placed on the tagged image 200 by the server 110 and/or the computing device 115, each of the system 100 of FIG. 1. The tagged image 200 includes, in some examples, a plurality of bounding boxes 205, where each of the bounding boxes 205 surrounds a tooth depicted in the tagged image 200 using approximately the smallest dimensions available for the bounding box 205 to surround the tooth. The tagged image 200 further includes a plurality of bounding boxes 210, where each of the bounding boxes 210 surrounds a feature of a tooth depicted in the tagged image 200 using approximately the smallest dimensions available for the bounding box 210 to surround the feature. The tagged image 200 further includes a plurality of bounding boxes 215, where each of the bounding boxes 215 surrounds another feature of a tooth depicted in the tagged image 200 using approximately the smallest dimensions available for the bounding box 215 to surround the another feature. The features are, for example, an Infundibulum of the tooth, a Dental Star of the tooth, and/or a Galvayne's Groove of the tooth. In at least some examples, a number of features identified and tagged with bounding boxes for each tooth depicted in the tagged image 200 varies, such that some teeth include a bounding box 205, some teeth include a bounding box 210, and some teeth include a bounding box 215, but not all teeth include all of the bounding box 205, the bounding box 210, and the bounding box 215. For example, a first tooth may have a first feature but not a second feature, a second tooth might have the second feature but not the first feature, and a third tooth might have both the first feature and the second feature.

Figure 3:
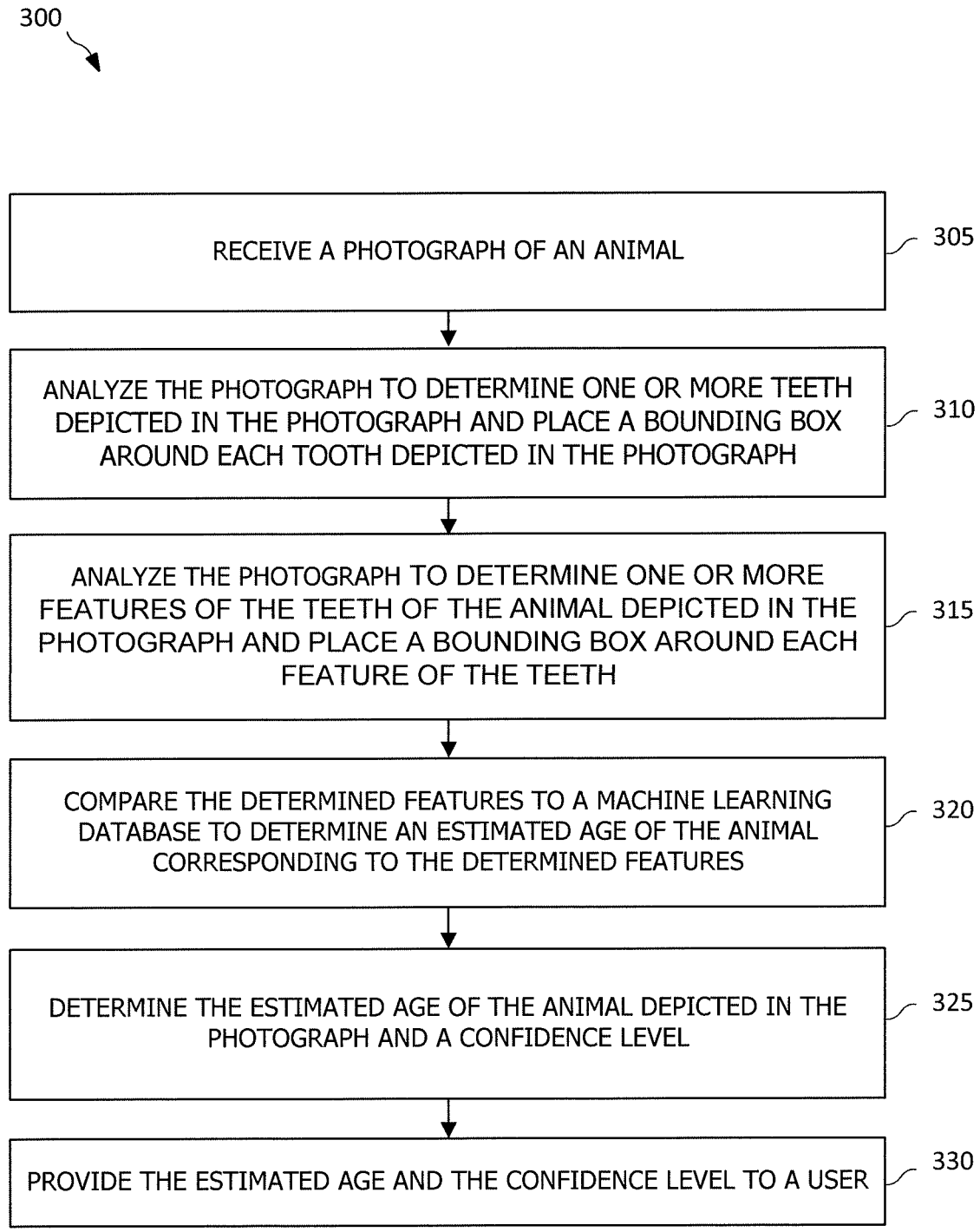
FIG. 3 shows a flowchart of an illustrative method in accordance with various examples.

Turning now to FIG. 3, a flowchart of an illustrative method 300 is shown. In at least some examples, the method 300 is implemented, executed, performed, or otherwise corresponds to the system 100 of FIG. 1. In various examples, aspects or operations of the method 300 are implemented by any combination of the server 110 and/or the computing device 115, for example, such that the server 110 performs all of the method 300, the computing device 115 performs all of the method 300, or the server 110 performs part of the method 300 and the computing device 115 performs part of the method 300.

At operation 305, a photograph of an animal is received. The photograph is, in some examples, a top-down photograph of the lower teeth of an animal. In other examples, the photograph is a bottom-up photograph of the upper teeth of an animal. In yet other examples, the photograph shows side surfaces of the teeth of an animal (e.g., such that the side surfaces show vertical length of the teeth beginning at, and extending from, the animal's gums). In some examples, the photograph is received by the computing device 115 capturing the photograph, such as the computing device 115 using an imaging sensor (e.g., a camera) of the computing device to capture the photograph. In other examples, the photograph is captured by a device and then provided directly to the computing device 115 (e.g., through a coupling between the device that captured the photograph and the computing device 115) or indirectly to the computing device 115 (e.g., by interfacing a storage device on which the photograph was stored after being captured, such as a memory card, with the computing device 115). While one photograph is discussed herein with respect to the method 300, in at least some examples a plurality of photographs are received (e.g., such as any combination of a top-down photograph of the lower teeth of the animal, a bottom-up photograph of the upper teeth of the animal, and/or a side photograph of the teeth of the animal).

At operation 310, the photograph is analyzed to determine one or more teeth depicted in the photograph and a bounding box is placed around each tooth depicted in the photograph. In at least some examples, each bounding box has a smallest size (e.g., smallest height and width dimensions) possible for surrounding the tooth, for example, such that dimensions of the bounding box approximate dimensions of the tooth. The analysis and bounding box placement is performed, in at least some examples, by an application implementing and/or executing an object detection API, such as described above.

At operation 315, the photograph is analyzed to determine one or more features of the teeth of the animal depicted in the photograph and a bounding box is placed around each feature of the teeth. The one or more features include any one or more of an Infundibulum of a tooth from among the teeth, a Dental Star of a tooth from among the teeth, and/or a Galvayne's Groove of a tooth from among the teeth. In at least some examples, a first tooth depicted in the photograph includes a first number of features and a second tooth depicted in the photograph includes a second number of features, such that not all features are identified for all teeth depicted in the photograph. The analysis and bounding box placement is performed, in at least some examples, by an application implementing and/or executing an object detection API, such as described above.

At operation 320, the determined features are compared to a machine learning database to determine an estimated age of the animal corresponding to the determined features. For example, when the animal is a horse, the determined features are compared to features of horses stored in the machine learning database. When the animal is a cow, the determined features are compared to features of cows stored in the machine learning database, and so forth for other types of animals. In at least some examples, the features are compared to tagged images stored in the machine learning database, while in other examples the features are compared to stored data that relates dimensions of the determined features and/or the bounding boxes surrounding the determined features to an animal age. In some examples, the comparison is performed by comparing a starting position and size of the determined teeth and/or features to identified teeth and/or features of the tagged images stored in the machine learning database. For example, when a tooth of a tagged image stored in the machine learning database has coordinates (as discussed above) of a starting position of X, a width of A, and a height of B and coordinates of a determined tooth depicted in the photograph has a starting position of X, a width of A, and a height of B, an age associated with the tagged image stored in the machine learning database may correspond to the determined tooth depicted in the photograph. In at least some examples, the comparison includes a tolerance such that an exact match between the tagged image stored in the machine learning database and the determined tooth depicted in the photograph is not required, but instead a match within an allowed tolerance range is found. In at least some examples, a match between features of a tooth of the tagged image stored in the machine learning database and the determined tooth depicted in the photograph is determined in substantially the same manner as discussed above for a match between teeth.

At operation 325, an estimated age of the animal depicted in the photograph is determined. In some examples, the estimated age is associated with a confidence level in the estimated age. For example, the estimated age may be an age range, such as X years old to Y years old, with a confidence level of C in the accuracy of the estimated age range. In another example, the estimated age may be a particular age, such as X years old, with a confidence level of C in the accuracy of the estimated age. C is determined according to any suitable manner. For example, C may be determined based on a number of teeth identified as representative of a given age compared to a total number of teeth identified, a number of teeth identified as representative of a given age compared to an average age represented by all teeth identified, etc. Turning for a moment to FIG. 4, a table 400 is shown. The table 400 illustrates determinates visible in equine dental photographs, where the determinates are suitable for use in determining an age of a horse. As shown in table 400, the variable b is representative of a shape of a lower tooth, bs is representative of a shape of an infundibulum of a lower tooth, and bss is representative of a shape of a dental star of the lower tooth, the variable u is representative of a shape of an upper tooth, us is representative of a shape of an infundibulum of an upper tooth, and uss is representative of a shape of a dental star of the upper tooth. For both lower and upper teeth, numerical reference between 1 and 6 refers to a position of the tooth in the horse's mouth from a perspective standing in front of and looking at the horse, where the numbers begin with a left incisor and count up in a rightward direction. When a variable is listed in a row of the table 400 for an age associated with that row, the table 400 indicates that for that age, the feature corresponding to the listed variable is customarily expected to be present in the horse's mouth. As shown by the table 400, as a horse ages, a number of features, and the particular combination of features, visible in the horse's mouth varies. In this way, a number of features visible in a horse's mouth and/or a particular combination of features can be indicative of the horse's age and/or increase or decrease confidence in an estimated age of the horse (e.g., decrease confidence when data according to the table 400 contradicts an age determined according to the machine learning database and/or increase confidence when data according to the table 400 supports the age determined according to the machine learning database).

Returning to FIG. 3, at operation 330, the estimated age and the confidence level are provided to a user. In some examples, providing the estimated age and the confidence level to the user includes the server 110 transmitting the estimated age and the confidence level to the computing device 115 and the computing device 115 displaying the estimated age and the confidence level on a display associated with the computing device 115. In other examples, providing the estimated age and the confidence level to the user includes the computing device 115 manipulating pixels of a display to display the estimated age and the confidence level after the estimated age and the confidence level are determined by the computing device 115 (e.g., such that the estimated age and the confidence level need not be received by the computing device 115 from another device such as the server 110).

Figure 5:
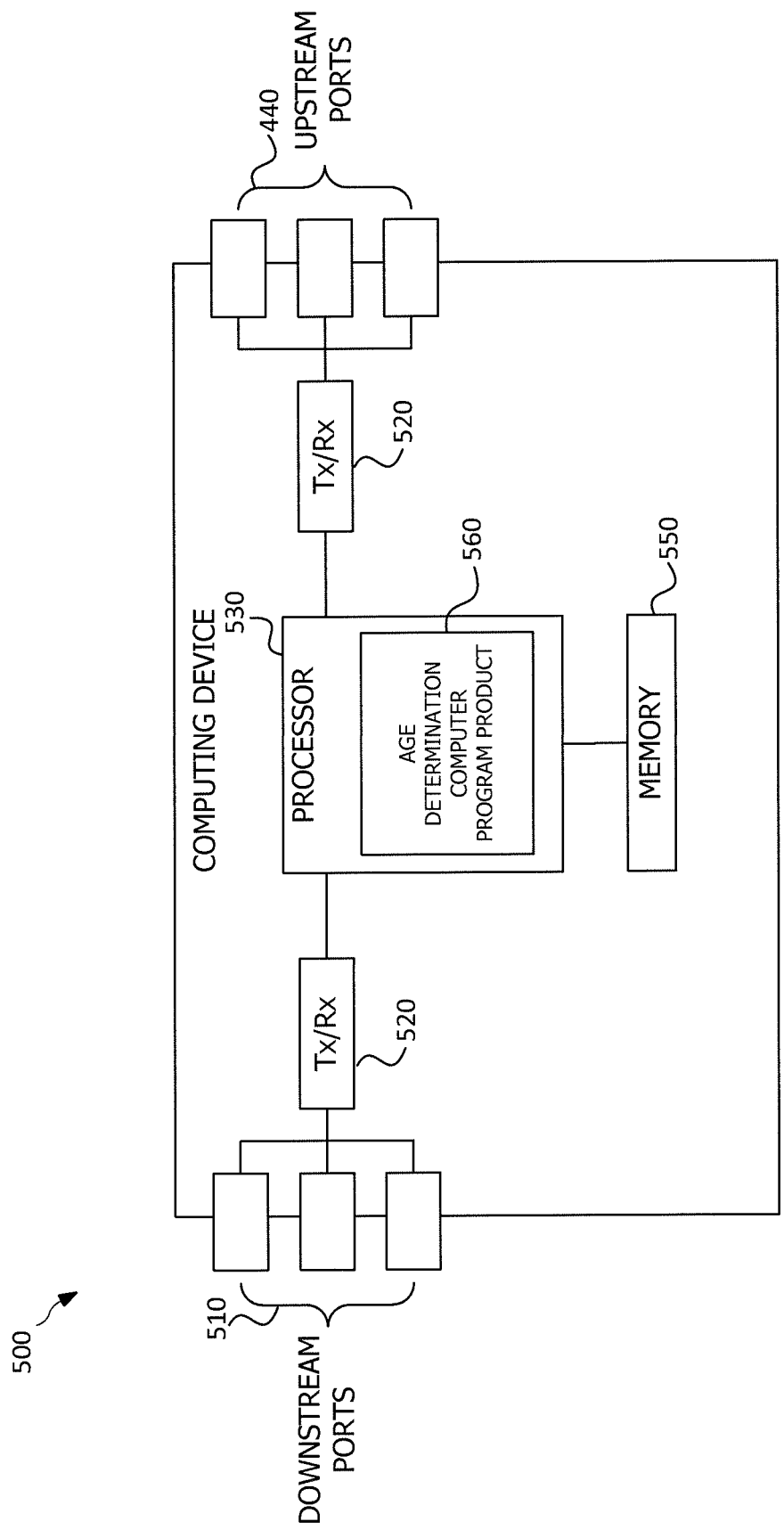
FIG. 5 shows a schematic diagram of an illustrative computing device in accordance with various examples.

Turning now to FIG. 5, a schematic diagram of an illustrative computing device 500 is shown. Computing device 500 may be any suitable processing device capable of performing the functions disclosed herein such as a computer system (such as the system 100 of FIG. 1), a server (such as the server 110 of the system 100 of FIG. 1), a cloud computing node, a computing device (such as the computing device 115 of the system 100 of FIG. 1), or may be generally representative of a distributed computing device in which one or more components of computing device 500 are distributed or shared across one or more devices. Computing device 500 is configured to implement at least some of the features/methods disclosed herein, for example, the age determination of system 100 and/or methods 300, discussed above. In various embodiments, for instance, the features/methods of this disclosure are implemented using hardware, firmware, and/or software installed to run on hardware.

The computing device 500 comprises one or more downstream ports 510 coupled to a transceiver (Tx/Rx) 520, which are transmitters, receivers, or combinations thereof. The Tx/Rx 520 transmits and/or receives frames or other data from other devices via the downstream ports 510. Similarly, the computing device 500 comprises another Tx/Rx 520 coupled to a plurality of upstream ports 540, wherein the Tx/Rx 520 transmits and/or receives frames or other data from other devices via the upstream ports 540. The downstream ports 510 and/or the upstream ports 540 may include electrical and/or optical transmitting and/or receiving components. In another embodiment, the computing device 500 comprises one or more antennas (not shown) coupled to the Tx/Rx 520. The Tx/Rx 520 transmits and/or receives data (e.g., packets) from other computing or storage devices wirelessly via the one or more antennas.

A processor 530 is coupled to the Tx/Rx 520 and is configured to determine an age of an animal depicted in an image based on dental characteristics of the animal, for example, at least partially to a machine learning database relating dental features of animals to ages of the animals. In an embodiment, the processor 530 comprises one or more multi-core processors and/or memory modules 550, which functions as data stores, buffers, etc. The processor 530 is implemented as a general processor or as part of one or more application specific integrated circuits (ASICs), field-programmable gate arrays (FPGAs), and/or digital signal processors (DSPs). Although illustrated as a single processor, the processor 530 is not so limited and alternatively comprises multiple processors. The processor 530 further comprises processing logic configured to execute an age determination computer program product 560 that is configured to determine an age of an animal depicted in an image based on dental characteristics of the animal.

FIG. 5 also illustrates that a memory module 550 is coupled to the processor 530 and is a non-transitory medium configured to store various types of data. Memory module 550 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 550 may be used to house the instructions for carrying out the various embodiments or examples described herein. For example, the memory module 550 may comprise the age determination computer program product 560, which is executed according by processor 530.

It is understood that by programming and/or loading executable instructions onto the computing device 500, at least one of the processor 530 and/or the memory module 550 are changed, transforming the computing device 500 in part into a particular machine or apparatus, for example, an age determination device having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In the foregoing discussion, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party. Unless otherwise stated, "about", "approximately", or "substantially" preceding a value means+/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A system, comprising:
   a computing device configured to capture an image depicting dental characteristics of an animal; and
   a server configured to:
      receive the image from the computing device;
      determine, based on contents of the image as represented in pixels of the image, a plurality of teeth depicted in the image;
      determine at least one feature associated with at least one of the plurality of teeth;
      determine an estimate age of the animal based at least partially on the determined plurality of teeth and the at least one feature; and
      provide the estimated age of the animal.

2. The system of claim 1, wherein the image is one of:
   a top-down image of lower teeth of the animal;
   a bottom-up image of upper teeth of the animal; or
   a side image of teeth of the animal.

3. The system of claim 1, wherein the at least one feature is selected from dimensions of a chewing surface, an Infundibulum, a Dental Star, or a Galvayne's Groove.

4. The system of claim 1, wherein determining the plurality of teeth depicted in the image comprises:
   analyzing the image to identify the plurality of teeth;
   isolating each of the plurality of teeth from one another; and
   placing a bounding box around each isolated tooth of the plurality of teeth, wherein each bounding box has a minimum length and width dimension possible for surrounding each respective isolated tooth of the plurality of teeth.

5. The system of claim 1, wherein determining the at least one feature associated with the at least one of the plurality of teeth comprises:
analyzing the image to identify the at least one feature; and
placing a bounding box around the at least one feature, wherein the bounding box has a minimum length and width dimension possible for surrounding the at least one feature.

6. The system of claim 1, wherein determining the estimate age of the animal based at least partially on the determined plurality of teeth and the at least one feature comprises:
comparing the determined plurality of teeth and the determined at least one feature to a database associating dental characteristic of control animals of a similar type as the animal with ages of the control animals of the similar type as the animal.

7. The system of claim 1, wherein the server is further configured to determine a confidence level in the estimate age of the animal, wherein the confidence level indicates a confidence of the system in accuracy of the estimated age.

8. The system of claim 7, further comprising providing the confidence level in the estimated age of the animal, wherein providing the estimated age of the animal and providing the confidence level in the estimated age of the animal comprises transmitting the estimated age of the animal and the confidence level in the estimated age of the animal to the computing to cause the computing device to display the estimated age of the animal and the confidence level in the estimated age of the animal on a display associated with the computing device.

9. A method, comprising:
obtaining an image depicting dental characteristics of an animal;
determining a plurality of teeth depicted in the image;
determining, based on contents of the image as represented in pixels of the image, at least one feature associated with at least one of the plurality of teeth;
determining an estimate age of the animal based at least partially on the determined plurality of teeth and the at least one feature; and
providing the estimated age of the animal to a user.

10. The method of claim 9, wherein determining the plurality of teeth depicted in the image comprises:
analyzing the image to identify the plurality of teeth;
isolating each of the plurality of teeth from one another; and
placing a bounding box around each isolated tooth of the plurality of teeth, wherein each bounding box has a minimum length and width dimension possible for surrounding each respective isolated tooth of the plurality of teeth.

11. The method of claim 9, wherein determining the at least one feature associated with the at least one of the plurality of teeth comprises:
analyzing the image to identify the at least one feature; and
placing a bounding box around the at least one feature, wherein the bounding box has a minimum length and width dimension possible for surrounding the at least one feature.

12. The method of claim 9, wherein determining the estimate age of the animal based at least partially on the determined plurality of teeth and the at least one feature comprises:
comparing the determined plurality of teeth and the determined at least one feature to a database associating dental characteristic of control animals of a similar type as the animal with ages of the control animals of the similar type as the animal.

13. The method of claim 9, wherein the image is one of a top-down image of lower teeth of the animal, a bottom-up image of upper teeth of the animal, or a side image of teeth of the animal, and wherein the at least one feature is selected from dimensions of a chewing surface, an Infundibulum, a Dental Star, or a Galvayne's Groove.

14. The method of claim 9, further comprising determining a confidence level in the estimate age of the animal, wherein the confidence level indicates a confidence in accuracy of the estimated age.

15. The method of claim 14, further comprising providing the confidence level in the estimated age of the animal, wherein providing the estimated age of the animal and providing the confidence level in the estimated age of the animal comprises transmitting the estimated age of the animal and the confidence level in the estimated age of the animal to a computing device to cause the computing device to display the estimated age of the animal and the confidence level in the estimated age of the animal on a display associated with the computing device.

16. An apparatus, comprising:
a non-transitory memory configured to store executable program instructions; and
a processor configured to execute the program instructions to:
obtain an image depicting dental characteristics of an animal;
determine a plurality of teeth depicted in the image;
determine, based on contents of the image as represented in pixels of the image, at least one feature associated with at least one of the plurality of teeth;
determine an estimate age of the animal based at least partially on the determined plurality of teeth and the at least one feature; and
provide the estimated age of the animal to a user.

17. The apparatus of claim 16, wherein determining the plurality of teeth depicted in the image comprises:
analyzing the image to identify the plurality of teeth;
isolating each of the plurality of teeth from one another; and
placing a bounding box around each isolated tooth of the plurality of teeth, wherein each bounding box has a minimum length and width dimension possible for surrounding each respective isolated tooth of the plurality of teeth.

18. The apparatus of claim 16, wherein determining the at least one feature associated with the at least one of the plurality of teeth comprises:
analyzing the image to identify the at least one feature; and
placing a bounding box around the at least one feature, wherein the bounding box has a minimum length and width dimension possible for surrounding the at least one feature.

19. The apparatus of claim 16, wherein determining the estimate age of the animal based at least partially on the determined plurality of teeth and the at least one feature comprises:
comparing the determined plurality of teeth and the determined at least one feature to a database associating dental characteristic of control animals of a similar type as the animal with ages of the control animals of the similar type as the animal.

20. The apparatus of claim 16, wherein the image is one of a top-down image of lower teeth of the animal, a bottom-up image of upper teeth of the animal, or a side image of teeth of the animal, and wherein the at least one feature is selected from dimensions of a chewing surface, an Infundibulum, a Dental Star, or a Galvayne's Groove.

* * * * *